United States Patent [19]

Kawashima et al.

[11] Patent Number: 5,686,545
[45] Date of Patent: *Nov. 11, 1997

[54] LIQUID RESIN, PROCESS FOR THE PRODUCTION THEREOF AND ITS USE

[75] Inventors: Miki Kawashima; Kunio Horiuchi, both of Tokyo, Japan

[73] Assignee: Toyo Ink Manufacturing Co., Ltd., Tokyo, Japan

[*] Notice: The term of this patent shall not extend beyond the expiration date of Pat. No. 5,576,405.

[21] Appl. No.: 691,017

[22] Filed: Aug. 5, 1996

Related U.S. Application Data

[62] Division of Ser. No. 257,050, Jun. 8, 1994, Pat. No. 5,576,405.

[30] Foreign Application Priority Data

Jun. 11, 1993 [JP] Japan ................................. 5-140533

[51] Int. Cl.⁶ .................. C08F 220/10; C08F 220/18; C08F 220/44; C08F 212/06; C07G 69/73
[52] U.S. Cl. ................ 526/318.4; 526/329.2; 526/329.3; 526/330; 526/342; 560/183; 560/205
[58] Field of Search ................ 526/318.4, 329.2, 526/329.3, 330, 342; 560/183, 205

[56] References Cited

U.S. PATENT DOCUMENTS

| | | |
|---|---|---|
| 2,199,557 | 7/1940 | Charlton et al. ............ 526/318.4 |
| 3,032,531 | 5/1962 | Sanderson ................ 526/318.4 |
| 4,120,841 | 10/1978 | Takahashi et al. ........... 526/318.4 |
| 5,292,842 | 3/1994 | Yang ..................... 526/318.4 |

FOREIGN PATENT DOCUMENTS

| | | |
|---|---|---|
| 2 240 242 | 3/1975 | France . |
| 59/066597 | 4/1984 | Japan . |
| 1 469 682 | 4/1977 | United Kingdom . |

*Primary Examiner*—Joseph L. Schofer
*Assistant Examiner*—Wu C. Cheng
*Attorney, Agent, or Firm*—Wenderoth, Lind & Ponack

[57] ABSTRACT

A liquid resin having a number average molecular weight of 10,000 to 200,000 and a viscosity, measured at 50° C., of 500 to 30,000 cps, obtained by the copolymerization of a composition containing (a) 35 to 98% by weight of a monomer of the formula, $$CH_2=C(R^1)COOR^2$$

wherein $R^1$ is hydrogen or methyl and $R^2$ is a hydrocarbon group having 4 to 22 carbon atoms, (b) 2 to 40% by weight of a polymerizable unsaturated carboxylic acid, and (c) 0 to 60% by weight of other polymerizable vinyl monomer.

13 Claims, No Drawings

LIQUID RESIN, PROCESS FOR THE PRODUCTION THEREOF AND ITS USE

This application is a division of application Ser. No. 08/257,050, filed Jun. 8, 1994, now U.S. Pat. No. 5,576,405.

FIELD OF THE INVENTION

The present invention relates to a liquid resin which can be applied without a solvent, a process for the production thereof, and a substantially solventless or solvent-free coating composition.

PRIOR ART OF THE INVENTION

For coating cans or containers formed of metals or plastic films, coating compositions containing organic solvents are conventionally used. Conventional coating compositions release or dissipate a large amount of organic solvents at the steps of their application and drying for curing them. With a deepening interest in global or working environments, limitations are being imposed on the use of such coating compositions. As one method to cope with the limitations, a water-based coating composition or powder has been proposed. However, the water-based coating composition still contains an organic solvent to some extent for improving the dispersibility of a pigment and the coatability, so that problems on safety and hygiene in a working environment still remain to be solved. Further, an additional cost is required for the incineration of a released organic solvent and for the treatment of waste water. In a large-scaled coating plant having facilities for treating exhaust gases, it is possible to prevent the exhausting of organic solvents into atmosphere. In a small-scaled plant having no such facilities, organic solvents may be disposed of, while it is difficult to treat waste water. Further, for using a powder coating composition, the application machine and method are greatly different from conventional ones, and it is hence required to employ a novel machine.

For overcoming the above problems, the development of a high-solid coating composition and the improvement in a water-based coating composition are under way. It is therefore assumed that the use of coating compositions containing organic solvents tends to decrease more remarkably. For fundamentally solving the above problems, however, it has been and is desired to develop a solventless coating composition which is free of problems such as environmental pollution, safety and hygiene problems, inflammability and explosion, which can permit the application in a wide range and which can be applied with ease. For meeting the above desire, JP-A-57-171 discloses a method using a liquid resin from an acryl monomer. However, the resin obtained is an oligomer having a molecular weight of 8,000 or less, or a low-molecular-weight substance is contained in a coating composition. As a result, the low-molecular-weight substance may dissipate, or it is desired to improve the method in safety and hygiene. Further, as far as physical properties are concerned, it is known that when a coating composition composed of a resin in the range of an oligomer is used, it is difficult to control the physical properties of a cured coating (Summary Print of 1992 Lecture Meeting on "Study of Adhesion and Coating", Soichi Muroi, page 4, 1993), and it is desired to increase the molecular weight while maintaining the low viscosity.

SUMMARY OF THE INVENTION

It is an object of the present invention to provide a liquid resin suitable for use in a solventless coating composition and a process for the production of the liquid resin.

It is another object of the present invention to provide a substantially solventless coating composition obtained by incorporating a curing agent into a liquid resin.

It is further another object of the present invention to provide a solventless resin coating composition which can be cured by a conventional heating and drying method.

It is still further another object of the present invention to provide a substantially solventless coating composition which is self-crosslinkable.

According to the present invention, there is provided a liquid resin having a number average molecular weight of 10,000 to 200,000 and a viscosity, measured at 50° C., of 500 to 30,000 cps, obtained by the copolymerization of a composition containing (a) 35 to 98% by weight of a monomer of the formula,

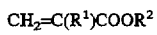

wherein $R^1$ is hydrogen or methyl and $R^2$ is a hydrocarbon group having 4 to 22 carbon atoms, (b) 2 to 40% by weight of a polymerizable unsaturated carboxylic acid, and (c) 0 to 60% by weight of other polymerizable vinyl monomer.

Further, according to the present invention, there is provided a process for the production of a liquid resin, which comprises copolymerizing the above monomers (a), (b) and (c) in a solvent which is a good solvent to the monomers (a), (b) and (c) but a poor solvent to the liquid resin.

Further, according to the present invention, there is provided a substantially solventless coating composition comprising the above liquid resin and a curing agent.

DETAILED DESCRIPTION OF THE INVENTION

In the present invention, the monomer (a) is used as a component for forming a copolymer in the form of a liquid. In the formula for the monomer (a), $R^1$ is hydrogen or methyl and $R^2$ is a hydrocarbon group having 4 to 22 carbon atoms. The hydrocarbon group having 4 to 22 carbon atoms includes a saturated or unsaturated alkyl group, an alicyclic group and an aromatic group. Preferred is an alkyl group. The monomer (a) includes octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, heneicosyl (meth)acrylate and docosyl (meth)acrylate. Acrylates or methacrylates having an alkyl group having 9 to 18 carbon atoms are preferred since these (meth)acrylates can serve to effectively decrease the viscosity of the liquid resin. The above monomers may be used alone or in combination. The amount of the monomer (a) based on the composition is 35 to 98% by weight, preferably 50 to 92% by weight. When the amount of the monomer (a) for the composition is smaller than the above lower limit, undesirably, it is difficult to produce a copolymer in the form of a liquid. When the above amount exceeds the above upper limit, undesirably, it is difficult to obtain a hard coating.

The polymerizable unsaturated carboxylic acid (b) is used for introducing a bonding site to bond to a curing agent or a functional monomer [other polymerizable vinyl monomer (c)] to the liquid resin. The polymerizable unsaturated carboxylic acid (b) includes maleic anhydride, maleic acid, fumaric acid, itaconic acid, citraconic acid, alkyl or alkenyl monoesters of these, phthalic acid β-(meth)acryloxyethyl monoester, terephthalic acid β-(meth)acryloxyethyl monoester, succinic acid β-(meth)acryloxyethyl monoester, acrylic acid, methacrylic acid, crotonic acid and cinnamic acid.

The amount of the polymerizable unsaturated carboxylic acid (b) based on the composition is 2 to 40% by weight, preferably 5 to 30% by weight. When the above amount is less than 2% by weight, it is difficult to obtain a hard coating. When the above amount is more than the above upper limit, the liquid resin shows a high viscosity and it is difficult to coat the liquid resin.

The composition for forming the liquid resin of the present invention may contain a polymerizable vinyl monomer (c) other than the monomers (a) and (b). The polymerizable vinyl monomer (c) is primarily used for adjusting the water resistance and hardness of a coating. For this purpose, it is preferred to use a nonfunctional vinyl monomer (c1). The nonfunctional vinyl monomer (c1) includes aromatic monomers such as styrene, vinyltoluene and vinylpyridine, (meth)acrylates having an alkyl group having 3 carbon atoms or less such as methyl methacrylate and ethyl methacrylate, carboxylic acid vinyl monomers such as vinyl acetate and vinyl butyrate, N-vinylpyrrolidone, N-vinylcarbazole, diallyl phthalate, acrylonitrile and vinyl chloride.

The secondary purpose in the use of the polymerizable vinyl monomer (c) is to impart the liquid resin with self-crosslinkability by reacting it with other functional group, particularly the carboxyl group of the polymerizable unsaturated carboxylic acid (b). For this purpose, a functional vinyl monomer (c2) is used. The functional vinyl monomer (c2) includes hydroxyl group-containing (meth)acrylates such as 2-hydroxyethyl (meth)acrylate, 2-hydroxypropyl (meth)acrylate, 4-hydroxybutyl (meth)acrylate, glycerol mono(meth)acrylate, diethylene glycol mono(meth)acrylate, dipropylene glycol mono(meth)acrylate and polyethylene glycol (meth)acrylate, alkoxyl group-containing (meth) acrylates such as methoxydiethylene glycol (mono)acrylate and methoxypolyethylene glycol (meth)acrylate, epoxy group-containing monomers such as glycidyl (meth) acrylate, allylglycidyl ether and glycidyl cinnamate, amino group-containing (meth)acrylates such as N-methylol-(meth)acrylamide, N-methoxymethyl(meth)acrylamide and N-ethoxymethyl (meth)acrylamide, poly(meth)acrylates of polyhydric alcohols such as ethylene glycol di(meth) acrylate, diethylene glycol di(meth)acrylate, triethylene glycol di(meth)acrylate, tetraethylene glycol di(meth)acrylate, polyethylene glycol di(meth)acrylate, trimethylolpropane tri (meth)acrylate, pentaerythritol tetra(meth)acrylate and dipentaerythritol hexa(meth)acrylate, polyvalent acrylate monomers such as poly(meth)acrylates of resins such as polyesters, polyethers, polyurethanes, epoxyoligomers, polysulfides, polycaprolactones and polycarbonates, and isocyanate group-containing monomers such as methacryloylethyl isocyanate.

The amount of the "other" vinyl monomer (c) based on the composition is 0 to 60% by weight, preferably 1 to 40% by weight. The amount of the nonfunctional vinyl monomer (c1) and the amount of the functional vinyl monomer (c2) are properly determined within the above range, and further, these amounts are also determined depending upon the kind of the vinyl monomers (c).

When the nonfunctional vinyl monomer (c1) is used, the amount of the nonfunctional vinyl monomer (c1) based on the composition is 1 to 40% by weight, preferably 20% by weight or less. When the above amount exceeds 40% by weight, it is difficult to coat the coating composition.

When the functional vinyl monomer (c2) is used, it is preferred to select the following amounts depending upon the kinds thereof. When a hydroxyl group-containing (meth) acrylate, an alkoxyl group-containing (meth)acrylate, an epoxy group-containing monomer or an amino group-containing monomer is used, the amount thereof on the basis of the composition is 1 to 40% by weight, preferably 5 to 40% by weight. When a poly(meth)acrylate monomer is used, the amount thereof on the basis of the composition is preferably 1 to 10% by weight.

As the polymerizable vinyl monomer (c), the nonfunctional vinyl monomer (c1) and the functional vinyl monomer (c2) may be used in combination as required.

The liquid resin of the present invention is synthesized by adjusting the amount of a polymerization initiator such that the liquid resin has a number average molecular weight, measured by a GPC method (gel permeation chromatography), of 10,000 to 200,000, preferably 10,000 to 150,000.

When the above number average molecular weight is smaller than the above lower limit, undesirably, it is difficult to isolate the resin content from the polymerization solution, and further, a coating shows a decrease in mechanical properties such as hardness and flexibility, solvent resistance and boiling water resistance. When the above number average molecular weight is greater than the above upper limit, undesirably, the liquid resin cannot retain the viscosity sufficient for forming a coating.

The liquid resin of the present invention can be produced by a radical-polymerization solution method or dispersion method in the presence of a known radical polymerization initiator. The solvent used for the polymerization is selected from generally used organic solvents such as ethyl acetate, methyl ethyl ketone, toluene, benzene, dioxane, tetrahydrofuran, methanol, ethanol, n-propanol, isopropanol, n-butanol, sec-butanol, tert-butanol, methyl cellosolve, butyl cellosolve, methyl carbitol, ethyl carbitol, methyl cellosolve acetate, ethyl cellosolve acetate and diacetone alcohol.

Meanwhile, the liquid resin has a solubility parameter (sp value) of 8.0 to 9.5 $(cal/cm^3)^{1/2}$. When a solvent having an sp value of at least 10.0 $(cal/cm^3)^{1/2}$, preferably at least 11.5 $(cal/cm^3)^{1/2}$, is used, only a polymer which has reached a desirable degree of polymerization separates itself from the reaction solution, and desirably, the resin content can be easily isolated by removing a supernatant. The solvent having an sp value of at least 10.0 $(cal/cm^3)^{1/2}$ includes isopropanol, n-propanol, methanol, ethanol, allyl alcohol, ethylene glycol, propylene glycol and methyl cellosolve. The above solubility parameter (sp value) is determined by the following equation.

$$\text{Solubility parameter} = \delta = (E/V)^{1/2}$$

E=Molecule cohesive energy, V=molecular volume

Further, a water-miscible solvent is also preferred since the resin content can be isolated by adding water alone. The water-miscible solvent includes dioxane, isopropanol, n-propanol, methanol, tetrahydrofuran, methyl cellosolve, butyl cellosolve, methyl carbitol and ethyl carbitol.

The polymerization initiator includes peroxide initiators such as benzolyl peroxide, t-butyl peroxide, cumene hydroxyperoxide and lauroyl peroxide, azo initiators such as azobisisobutyronitrile and azobiscyclohexanenitrile, and persulfates such as potassium persulfate and ammonium persulfate. The amount of the polymerization initiator based on the monomer weight is 0.01 to 5% by weight, preferably 0.1 to 3% by weight.

The curing agent used in the present invention is a compound which bonds to the carboxyl group of the liquid resin or the functional group of the functional monomer to introduce a crosslinking structure into the resin so that it can cure the resin. The curing agent is preferably selected from compounds having at least two functional group per molecule. The curing agent includes polyhydric alcohol or polyhydric phenol compounds such as ethylene glycol, diethylene glycol, glycerin, erythritol, arabitol, xylitol, sorbitol, dulcitol, mannitol, catechol, resorcin, hydroquine, guaiacol, hexylresorcin, pyrogallol, trihydroxybenzene, fluoroglucine and dimethylolphenol, alkoxy-modified products of these, melamine compounds having an alkylol or alkoxy group such as hexamethylolated melamine, hexamethoxymethylated melamine and hexabutoxymethylated melamine, amino resins such as cyanuric acid, ammelide, melamine, benzoguanamine, diethanolamine, triethanolamine and diaminopyridine, polyisocyanates such as tolylene diisocyanate, 4,4'-diphenylmethane diisocyanate, hexamethylene diisocyanate, m-xylylene diisocyanate, p-xylylene diisocyanate, 1,5-naphthalene diisocyanate, isophorone diisocyanate, lysine diisocyanate, hydrogenated 4,4'-diphenylmethane diisocyanate, hydrogenated tolylene diisocyanate, triphenylmethane triisocyanate and polymethylene polyphenyl isocyanate, polyisocyanates such as adducts of these with glycols or diamines, both terminals of which adducts are isocyanates, and epoxy resins such as neopentyl glycol diglycidyl ether, ethylene glycol diglycidyl ether, glycerin diglycidyl ether, propylene glycol diglycidyl ether, trimethylolpropane triglycidyl ether, hexamethylenediol diglycidyl ether and bisphenol A diglycidyl ether.

The amount of the curing agent is determined depending upon the ratio between the equivalent of functional group of the liquid resin and the equivalent of functional group of the curing agent. The amount of the curing agent per equivalent of the functional group of the liquid resin is 0.3 to 10 reaction equivalents, preferably 0.5 to 5 reaction equivalents. When the amount of the curing agent is smaller than the above lower limit, no hard coating is formed. When the above amount is greater than the above upper limit, undesirably, the volume contraction ratio at a curing time is large, unreacted curing agent remains, or a coating is fragile.

For improving the curing properties, the coating composition of the present invention may contain a generally used curing catalyst. Typical examples of the curing catalyst include p-toluenesulfonic acid, phthalic anhydride, benzoic acid, benzenesulfonic acid, dodecylbenzenesulfonic acid, formic acid, acetic acid, itaconic acid, oxalic acid, maleic acid, and ammonium salts, lower amine salts and polyvalent metal salts of the above acids.

The coating composition of the present invention is composed of the liquid resin obtained by the copolymerization of the above monomers, and it can be used as a substantially solventless coating composition. However, for improving the coatability, the coating composition of the present invention may contain a small amount of water or an organic solvent in an amount of up to 5% by weight of the liquid resin. Further, the coating composition of the present invention may further contain a colorant such as titanium white or other pigment and a lubricant.

The coating composition of the present invention is applied to metal plates such as a steel plate and an aluminum plate and substrates such as a plastic plate to form a coating having a thickness of 2 to 30 μm, and cured by heating the coating at a temperature between 150° and 260° C. for 1 to 30 minutes. The coating composition of the present invention is applied with a roll coater, a knife coater, or the like.

The present invention will be further detailed hereinafter with reference to Examples.

EXAMPLE 1

| | |
|---|---|
| Isopropyl alcohol | 220 ml |
| Water | 50 ml |
| n-Octyl methacrylate | 100 g |
| Phthalic acid β-methacryloxyethyl monoester | 15 g |
| Azobisisobutyronitrile (AIBN) | 1.2 g |

A 500-ml four-necked round-bottom flask having a stirrer, a nitrogen-introducing tube, a temperature sensor, a dropping funnel and a condenser was charged with the above materials. The temperature inside the flask was increased to 65° C. in a hot bath, and the reaction was continued for 4 hours. Water in an amount of 50 ml was added to the resultant polymer solution to precipitate a resin. When the precipitation started, the content in the flask was recharged into a 1-liter beaker with swirling. A supernatant was removed, and the remainder was washed with ethanol several times and then dried under reduced pressure at 50° C. overnight to give a resin.

The above-obtained resin was in the form of an odorless viscous liquid and had a number average molecular weight of 19,000. The resin was measured for a viscosity at 50° C. with a rotary vibration method viscometer (VM-100, supplied by Yamaichi Electric Co., Ltd.) to show 15,000 cps. Resins obtained in Examples to be described hereinafter were also measured for viscosities in the above manner.

EXAMPLE 2

A liquid resin was obtained in the same manner as in Example 1 except that the components and/or their amounts were changed as follows.

| | |
|---|---|
| Isopropyl alcohol | 205 ml |
| Water | 55 ml |
| Lauryl methacrylate | 100 g |
| Phthalic acid β-methacryloxyethyl monoester | 10 g |
| AIBN | 1.1 g |

The above-obtained resin was in the form of an odorless viscous liquid and had a number average molecular weight of 25,000. It was measured for a viscosity at 50° C. to show 5,000 cps.

EXAMPLE 3

A liquid resin was obtained in the same manner as in Example 1 except that the components and/or their amounts were changed as follows.

| | |
|---|---|
| Isopropyl alcohol | 285 ml |
| Water | 70 ml |
| Stearyl methacrylate | 140 g |
| Phthalic acid β-methacryloxyethyl monoester | 12 g |
| AIBN | 1.52 g |

The above-obtained resin was in the form of an odorless viscous liquid and had a number average molecular weight of 44,000. It was measured for a viscosity at 50° C. to show 6,000 cps.

EXAMPLE 4

A liquid resin was obtained in the same manner as in Example 1 except that the components and/or their amounts were changed as follows.

| | |
|---|---|
| Isopropyl alcohol | 210 ml |
| Water | 50 ml |
| Behenyl methacrylate | 105 g |
| Phthalic acid β-methacryloxyethyl monoester | 7.6 g |
| AIBN | 1.13 g |

The above-obtained resin was in the form of a wax-like solid and had a number average molecular weight of 45,000. However, it was in the form of a viscous liquid at 50° C. It was measured for a viscosity at 50° C. to show 25,000 cps.

EXAMPLE 5

A liquid resin was obtained in the same manner as in Example 1 except that the components and/or their amounts were changed as follows.

| | |
|---|---|
| Isopropyl alcohol | 250 ml |
| Water | 60 ml |
| Lauryl methacrylate | 110 g |
| Phthalic acid β-methacryloxyethyl monoester | 25 g |
| AIBN | 1.35 g |

The above-obtained resin was in the form of an odorless viscous liquid and had a number average molecular weight of 28,000. It was measured for a viscosity at 50° C. to show 6,500 cps.

EXAMPLE 6

A liquid resin was obtained in the same manner as in Example 1 except that the components and/or their amounts were changed as follows.

| | |
|---|---|
| Isopropyl alcohol | 260 ml |
| Lauryl methacrylate | 100 g |
| Phthalic acid β-methacryloxyethyl monoester | 10 g |
| AIBN | 1.1 g |

The above-obtained resin was in the form of an odorless viscous liquid and had a number average molecular weight of 25,000. It was measured for a viscosity at 50° C. to show 5,200 cps.

Comparative Example 1

A reaction was carried out in the same manner as in Example 1 except that the components and/or their amounts were changed as follows.

| | |
|---|---|
| Isopropyl alcohol | 260 ml |
| Lauryl methacrylate | 100 g |
| Phthalic acid β-methacryloxyethyl monoester | 10 g |
| AIBN | 6 g |

The resultant polymer solution was poured into water, while no resin content precipitated. Therefore, the solvent was removed with an evaporator to give a resin content in the form of a liquid.

The above-obtained resin content had a monomer odor and had a yellowish color. It was analyzed by GPC to show a number average molecular weight of 5,000, and a peak was also observed in the low molecular weight region of several hundreds in number average molecular weight. It was measured for a viscosity at 50° C. to show 2,000 cps.

Comparative Example 2

A reaction was carried out in the same manner as in Example 1 except that the components and/or their amounts were changed as follows.

| | |
|---|---|
| Isopropyl alcohol | 225 ml |
| Water | 55 ml |
| Lauryl methacrylate | 64 g |
| Phthalic acid β-methacryloxyethyl monoester | 57 g |
| AIBN | 1.2 g |

The resultant resin was not in the form of a liquid even if it was heated to 50° C., and no viscosity at 50° C. was measurable. It had a number average molecular weight of 42,000.

EXAMPLE 7

A liquid resin was obtained in the same manner as in Example 1 except that the components and/or their amounts were changed as follows.

| | |
|---|---|
| Isopropyl alcohol | 225 ml |
| Water | 55 ml |
| Lauryl methacrylate | 102 g |
| Phthalic acid β-methacryloxyethyl monoester | 12.5 g |
| Ethyl methacrylate | 5.7 g |
| AIBN | 1.2 g |

The above-obtained resin was in the form of an odorless viscous liquid and had a number average molecular weight of 32,000. It was measured for a viscosity at 50° C. to show 8,000 cps.

The liquid resins prepared in Examples were respectively mixed with a curing agent in amounts shown in Table 1, and the mixtures were heated at 50° C. and stirred to prepare solventless coating compositions in the form of a transparent liquid. Each of the coating compositions were respectively dropped on a hard aluminum plate maintained at 60° C. on a hot plate and coated thereon with a 0.5-mil applicator. The coated aluminum plates were placed in an electric oven at 200° C. and heated for 20 minutes to give cured coatings. Table 1 shows the physical properties of coatings obtained when the amounts and kinds of the curing agents were changed.

Further, the liquid resin prepared in Example 6, 1 reaction equivalent, per reaction equivalent of the liquid resin, of hexamethylolmelamine and 0.3% by weight, based on the liquid resin, of p-toluenesulfonic acid as a catalyst were mixed, and the mixture was heated at 50° C. and stirred to give a solventless resin coating composition in the form of a transparent liquid. This coating composition was dropped on a hard aluminum plate maintained at 50° C. on a hot plate and coated thereon with a 0.5-mil applicator. The coated plate was placed in an electric oven at 200° C. and heated for a predetermined period of time to give a cured coating. Table 2 shows the physical properties of coatings obtained after the heating for various periods of time.

"Tack" was manually evaluated.

A: showing no tack

B: showing tacking to some extent

C: showing tack

"Adhesion" was evaluated by a cross-cut peeling test using a Cellophane tape and expressed by a percentage of remaining coating (100/100).

"Solvent resistance" was evaluated by cutting an aluminum plate into a test piece having a size of 2 mm×2 mm, placing the test piece in tetrahydrofuran and leaving it as it was at room temperature for 1 day.

A: Showing no whitening

B: Showing a foggy appearance to some extent

C: Whitened

"Boiling water resistance" was evaluated by placing an aluminum plate in boiling water, leaving it as it was for 1 hour and observing whether or not the coating underwent whitening and/or peeling.

A: Showing no whitening

B: Showing a foggy appearance to some extent

C: Whitened

The abbreviations used in Tables 1 and 2 stand for the following.

HMM: Hexamethylolmelamine (synthetic product; powder)

MM: Methylated melamine (Cymel 350, supplied by Mitsui-Cyanamid)

BG: Benzoguanamine resin (Cymel 1123, supplied by Mitsui-Cyanamid)

BM: Butylated melamine resin (Cymel 1156, supplied by Mitsui-Cyanamid)

UR: Methylated urea resin (UFR65, supplied by Mitsui-Cyanamid)

Curing agent/liquid resin amount ratio: Ratio of functional group in curing agent/carboxylic acid in resin

TABLE 1

| Liquid Resin from: | Curing Agent | Curing agent/ liquid resin amount ratio | Tack | Solvent resistance | Boiling water resistance | Adhesion (%) |
|---|---|---|---|---|---|---|
| Ex. 1 | HMM | 1 | A | A | A | 95 |
| Ex. 2 | HMM | 1 | A | A | A | 100 |
| Ex. 3 | HMM | 1 | A | A | A | 100 |
| Ex. 4 | HMM | 1 | A | A | A | 100 |
| CEx. 1 | HMM | 1 | B | C | C | 60 |
| Ex. 2 | BM | 0.1 | C | C | B | 50 |
| Ex. 2 | BM | 1 | A | A | A | 95 |
| Ex. 2 | BM | 15 | A | A | B | 70 |
| Ex. 5 | MM | 0.1 | C | B | C | 50 |
| Ex. 5 | MM | 1 | A | A | A | 95 |
| Ex. 5 | MM | 15 | A | B | B | 75 |
| Ex. 5 | UR | 2 | A | A | A | 95 |
| Ex. 1 | UR | 2 | A | A | A | 100 |
| Ex. 2 | BG | 1 | A | B | A | 100 |
| Ex. 2 | MM | 1 | A | A | A | 95 |
| Ex. 2 | UR | 1 | A | A | A | 95 |

Ex. = Example, CEx. = Comparative Example

TABLE 2

| Liquid resin from: | Curing agent | Heating time (minute) | Tack | Solvent resistance | Boiling water resistance | Adhesion (%) |
|---|---|---|---|---|---|---|
| Ex. 6 | HMM | 5 | A | B | B | 95 |
| Ex. 6 | HMM | 10 | A | A | A | 100 |

Ex. = Example

EXAMPLE 8

A liquid resin was obtained in the same manner as in Example 1 except that the components and/or their amounts were changed as follows.

| Isopropyl alcohol | 200 ml |
|---|---|
| Water | 50 ml |
| n-Lauryl methacrylate | 45 g |
| Succinic acid β-methacryloxyethyl monoester | 10 g |
| Methoxydiethylene glycol methacrylate | 8 g |
| AIBN | 1 g |

The yield of the resin was 95%. The above-obtained resin was in the form of an odorless viscous liquid, and it had a number average molecular weight (as styrene) of 27,000 when measured by GPC. It was measured for a viscosity at 50° C. to show 15,000 cps.

EXAMPLE 9

A liquid resin was obtained in the same manner as in Example 8 except that the amount of water was changed to 25 ml and that the amount of isopropyl alcohol was changed to 225 ml. The yield of the resin was 97%. The above-obtained resin had a number average molecular weight of 32,000, and it was measured for a viscosity at 50° C. to show 18,000 cps.

Comparative Example 3

| Isopropyl alcohol | 200 ml |
|---|---|
| Water | 60 ml |
| n-Lauryl methacrylate | 15 g |
| Succinic acid β-methacryloxyethyl monoester | 23 g |
| Methoxydiethylene glycol methacrylate | 28 g |
| AIBN | 1 g |

The same flask as that used in Example 1 was charged with the above materials. The temperature inside the flask was increased to 65° C., and the reaction was continued for 4 hours. Then, 500 ml of diethyl ether was added to the resultant polymer solution to precipitate a resin. A supernatant was removed, and 100 ml of dioxane was added to the remainder. Further, diethyl ether was added to precipitate a resin, a supernatant was removed, and the remainder was recharged into an oven having a reduced pressure at 60° C. While the pressure in the oven was maintained at 5 mmHg, the resin was dried overnight. The yield of the resin was 90%, and the resin had a number average molecular weight (as styrene) of 38,000 when measured by GPC. It was in the form of a solid at room temperature (25° C.), and even if it was heated up to 90° C., its viscosity was not measurable.

Comparative Example 4

| Isopropyl alcohol | 150 ml |
|---|---|
| Water | 100 ml |
| n-Lauryl methacrylate | 45 g |
| Succinic acid β-methacryloxyethyl monoester | 10 g |
| Methoxydiethylene glycol methacrylate | 8 g |
| AIBN | 5 g |

The same flask as that used in Example 1 was charged with the above materials. The temperature inside the flask was increased to 65° C., and the reaction was continued for 4 hours. Then, 100 ml of water was added to the resultant polymer solution. The mixture was placed in a centrifugal precipitation tube, and a resin content was separated from the polymer solution with a centrifugal separator set at 5,000 rpm. A supernatant was removed, and IPA was added to the remainder to form a solution. A water/methanol (5:2) mixed solvent was added to the solution to precipitate the resin. A supernatant was removed, and the remainder was recharged into an oven having a reduced pressure at 60° C. While the pressure in the oven was maintained at 5 mmHg, the resin was dried overnight. The yield of the resin was 60%. The resin was in the form of a viscous liquid, and it had a number average molecular weight (as styrene) of 3,000 when measured by GPC. It was measured for a viscosity at 50° C. with a rotary vibration viscometer to show 2,000 cps.

EXAMPLE 10

| Isopropyl alcohol | 200 ml |
| Water | 50 ml |
| n-Lauryl methacrylate | 45 g |
| Succinic acid β-methacryloxyethyl monoester | 10 g |
| Diethylene glycol methacrylate | 7 g |
| AIBN | 1 g |

The same flask as that used in Example 1 was charged with the above materials. The temperature inside the flask was increased to 65° C. in a hot bath, and the reaction was continued for 3 hours. Water in an amount of 50 ml was added to the resultant polymer solution to precipitate a resin. When the precipitation started, the content in the flask was recharged into a 500-ml beaker with swirling. A supernatant was removed, and 300 ml of dioxane was added to the remainder to re-dissolve the resin. Methanol in an amount of 100 ml was added to re-precipitate the resin, a supernatant was removed, and the remainder was dried under reduced pressure at 50° C. overnight to give a resin. The yield of the resin was 95%. The resultant resin was in the form of an odorless viscous liquid, and it had a number average molecular weight of 24,000. It was measured for a viscosity at 50° C. with a rotary vibration viscometer to show 16,000 cps.

EXAMPLE 11

A liquid resin was obtained in the same manner as in Example 1 except that the components and/or their amounts were changed as follows.

| Isopropyl alcohol | 220 ml |
| Water | 60 ml |
| n-Pentadecyl methacrylate | 55 g |
| Phthalic acid β-methacryloxyethyl monoester | 7 g |
| Methoxytetraethylene glycol methacrylate | 7.5 g |
| AIBN | 1 g |

The yield of the resin was 96%. The resultant resin was in the form of an odorless viscous liquid, and it had a number average molecular weight of 20,000. It was measured for a viscosity at 50° C. to show 16,500 cps.

EXAMPLE 12

A liquid resin was obtained in the same manner as in Example 1 except that the components and/or their amounts were changed as follows.

| Isopropyl alcohol | 220 ml |
| Water | 25 ml |
| Steary methacrylate | 40 g |
| Maleic acid | 5 g |
| Methacrylic acid | 3 g |
| 4-Hydroxybutyl acrylate | 10 g |
| Styrene | 3 g |
| AIBN | 0.6 g |

The yield of the resin was 93%. The resultant resin was in the form of an odorless viscous liquid, and it had a number average molecular weight of 13,000. It was measured for a viscosity at 50° C. to show 23,000 cps.

The liquid resin prepared in Example 8 was dropped on a hard aluminum plate maintained at 80° C. on a hot plate and coated thereon with a 1-mil applicator. During the coating operation, there was no odor of low molecular weight organic compounds such as remaining monomers. After the coating was formed, no coating repellency was observed. The coated plate was placed in an electric oven at 200° C. and heated for 15 minutes to give a smooth hard coating. The formed coating was manually evaluated to show no tack. The coating remaining ratio in a cross cut test was 100%. The aluminum plate was cut into a test piece having a size of 2 cm×2 cm and the test piece was placed in tetrahydrofuran and left at room temperature for 1 day to show no whitening. Further, the aluminum plate was placed in boiling water and left therein for 1 hour to show no whitening or no peeling. Thus, the coating was excellent in solvent resistance and water resistance.

Further, the copolymer prepared in Comparative Example 4 was cured in the same manner as above. During the heating, there was odor which was assumed to be caused by the heat decomposition of the resin. The cured coating was manually evaluated to show no tack. The coating remaining ratio in a cross cut test was 70%. The aluminum plate was cut into a test piece having a size of 2 cm×2 cm and the test piece was placed in tetrahydrofuran and left at room temperature for 1 day to show whitening to some extent. Further, the aluminum plate was placed in boiling water and left therein for 1 hour to show partial whitening.

TABLE 3

| Resin from: | Curing conditions | | Tack | Solvent resistance | Boiling water resistance | Adhesion (%) |
| --- | --- | --- | --- | --- | --- | --- |
| | Temperature (°C.) | Time (minute) | | | | |
| Ex. 8 | 200 | 15 | A | A | A | 100 |
| Ex. 9 | 200 | 10 | A | B | A | 90 |
| Ex. 9 | 200 | 15 | A | A | A | 100 |
| Ex. 10 | 210 | 20 | A | A | A | 100 |
| Ex. 11 | 200 | 20 | A | A | B | 90 |
| Ex. 12 | 180 | 5 | A | B | B | 80 |
| Ex. 12 | 180 | 10 | A | B | A | 90 |
| CEx. 4 | 200 | 15 | A | C | B | 70 |

Ex. = Example, CEx. = Comparative Example
For the evaluations, see the explanations to Tables 1 and 2.

The liquid resin of the present invention can be applied at room temperature or by heating it to some extent. Further, according to the process for the production of a liquid resin, provided by the present invention, remaining monomers having low molecular weights are removed at the step of producing the resin, which prevents the dissipation or release of a solvent and monomers at a baking time. As a result, the working environment is improved.

What is claimed is:

1. A liquid resin having a number average molecular weight of 10,000 to 200,000 and a viscosity, measured at 50° C., of 500 to 30,000 cps, obtained by the copolymerization of a composition containing (a) 35 to 98% by weight of a monomer of the formula $$CH_2=C(R^1)COOR^2$$

wherein $R^1$ is hydrogen or methyl and $R^2$ is a hydrocabon group having 8 carbon atoms, (b) 2 to 40% by weight of a polymerizable unsaturated carboxylic acid, and (c) 0 to 60% by weight of other polymerizable vinyl monomer.

2. A liquid resin according to claim 1, wherein the monomer (a) is an acrylate or methacrylate of an alkyl group having 8 carbon atoms.

3. A liquid resin according to claim 1, wherein the polymerizable vinyl monomer (c) is a nonfunctional vinyl monomer (c1).

4. A liquid resin according to claim 1, wherein the composition contains 1 to 40% by weight of a nonfunctional vinyl monomer (c1) as the polymerizable vinyl monomer (c).

5. A liquid resin according to claim 3, wherein the nonfunctional vinyl monomer (c1) is at least one member selected from the group consisting of an aromatic monomer, a (meth)acrylate of an alkyl group having 3 carbon atoms or less, a vinyl carboxylate monomer and acrylonitrile.

6. A liquid resin according to claim 1, wherein the composition contains 1 to 40% by weight of a functional vinyl monomer (c2) having functional group reactive to carboxyl group as the polymerizable vinyl monomer (c).

7. A liquid resin according to claim 6, wherein the functional vinyl monomer (c2) is a vinyl monomer having at least one functional group selected from the group consisting of hydroxyl group, alkoxyl group, epoxy group, amino group and (meth)acryloyl group.

8. A liquid resin according to claim 1, wherein the composition contains a nonfunctional vinyl monomer (c1) and a functional vinyl monomer (c2) as the polymerizable vinyl monomer (c).

9. A substantially solventless, self-crosslinkable coating composition comprising the liquid resin as recited in claim 6.

10. A substantially solventless, self-crosslinkable coating composition which is self-crosslinkable and comprises the liquid resin as recited in claim 8.

11. A process for the production of the liquid resin as recited in claim 1, which comprises copolymerizing the monomers (a), (b) and (c) in a solvent which is a good solvent to the monomers (a), (b) and (c) but a poor solvent to the liquid resin.

12. A process according to claim 11, wherein the solvent is a water miscible solvent.

13. A process according to claim 11, wherein the solvent has a solubility parameter of at least 10.

* * * * *

UNITED STATES PATENT AND TRADEMARK OFFICE
CERTIFICATE OF CORRECTION

PATENT NO. : 5,686,545
DATED : November 11, 1997
INVENTOR(S) : MIKI KAWASHIMA and KUNIO HORIUCHI It is certified that error appears in the above-identified patent and that said Letters Patent is hereby corrected as shown below:

Column 13, line 8, correct the formula to read

--$CH_2 = C(R')COOR^2$--;

line 10, change "hydrocabon" to --hydrocarbon--.

Signed and Sealed this

Twenty-eighth Day of July, 1998

Attest:

BRUCE LEHMAN

Attesting Officer

Commissioner of Patents and Trademarks